W. B. GOODRICH.
Evaporating Pan.
No. 31,662.
Patented Mar. 12, 1861.
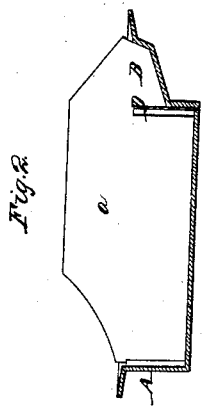
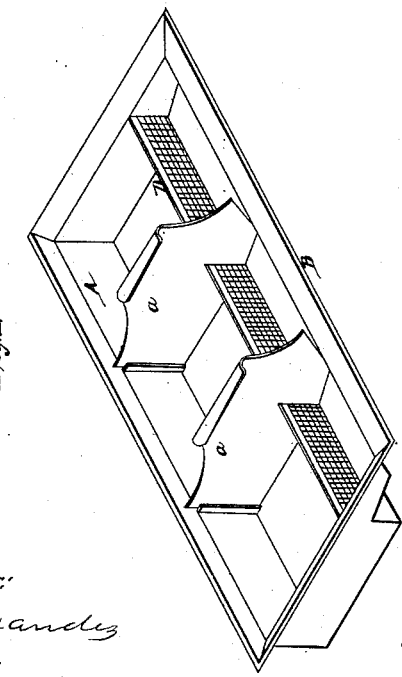

UNITED STATES PATENT OFFICE.

W. B. GOODRICH, OF ASHLEY, OHIO.

IMPROVEMENT IN APPARATUS FOR EVAPORATING SUGAR-SOLUTIONS.

Specification forming part of Letters Patent No. 31,662, dated March 12, 1861.

*To all whom it may concern:*

Be it known that I, W. B. GOODRICH, of Ashley, in the county of Delaware and State of Ohio, have invented certain new and useful Improvements in Evaporating-Pans; and I do hereby declare that the following is a clear, full, and exact description of the same, reference being had to the accompanying drawings, and to the letters of reference marked thereon, in which—

Figure 1 is a perspective, and Fig. 2 a plan or end, view of the pan.

The nature of my invention consists in the employment of a supplemental projecting pan with an inclined bottom raised above the bottom of the main pan and divided from said main pan by a gauze partition, for the purpose and in the manner hereinafter set forth.

To enable others skilled in the art to make and use my invention, I will proceed to describe its construction and operation.

A represents the main pan, which is provided with sliding or adjustable partitions *a a*.

B is a supplemental pan, which projects beyond the main pan and beyond the fire-surface. The bottom of this pan is inclined, and said pan is raised above the bottom of the main pan, so that the scum which escapes into it will not be affected by the ebullition of the sirup, but will be kept separate and apart from it.

D represents a perforated partition, which separates the two pans from each other. The object in having these sliding partitions *a a* is to separate the juice until all portions of it become equally heated. When this takes place the partitions are raised and the juice in the various apartments allowed to unite.

The process of evaporating with my invention is as follows: The juice being placed in the separate apartments, heat is applied at the bottom of the pan. The boiling juice will form a current toward the coolest part of the pan which is the projecting side. The excrementitious matter will rise with the juice and follow the current and be thrown off into the projecting pan, while the sirup will descend to the bottom, to be again thrown up by the action of the heat beneath. Thus it will be seen that the perforated partition D will act as a self-skimmer.

I would remark particularly that the pan should be made sufficiently large to evaporate the juice to sirup without refilling, and thus avoid making the sirup of a dark color.

Having thus fully described my invention, what I claim as new, and desire to secure by Letters Patent, is—

The employment of the supplementary pan B, raised above the bottom of the main pan, projecting beyond the fire-space, provided with an inclined bottom and separated from said main pan A by means of a gauze partition, D, for the purpose of preventing the scum and sediment from mingling with the body of the sirup when agitated by ebullition, substantially as specified.

W. B. GOODRICH.

Witnesses:
W. GRANGER,
H. N. COOMER.